(12) United States Patent
Helot et al.

(10) Patent No.: US 6,929,337 B2
(45) Date of Patent: Aug. 16, 2005

(54) RETRACTABLE STABILIZING SYSTEMS FOR COMPUTER HARDWARE

(75) Inventors: Jacques H Helot, Grenoble (FR); Gilbert Rahmouni, Claix (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 83 days.

(21) Appl. No.: 10/253,402

(22) Filed: Sep. 23, 2002

(65) Prior Publication Data

US 2003/0076017 A1 Apr. 24, 2003

(30) Foreign Application Priority Data

Sep. 24, 2001 (EP) .............................................. 01410120

(51) Int. Cl.[7] .................................................. H05K 7/18
(52) U.S. Cl. .................................. 312/223.2; 312/351.8
(58) Field of Search .......................... 312/351.1, 351.4, 312/351.8, 223.2; 220/629; 248/346.01, 918; 361/724, 683

(56) References Cited

U.S. PATENT DOCUMENTS

| | | | | |
|---|---|---|---|---|
| 1,997,640 A | * | 4/1935 | Huff | 206/216 |
| 2,395,304 A | * | 2/1946 | Stableford | 160/24 |
| 2,609,072 A | * | 9/1952 | Levinson | 190/11 |
| 3,729,192 A | * | 4/1973 | Nielsen | 473/30 |
| 4,635,811 A | | 1/1987 | Lodi | 220/69 |
| 4,872,733 A | | 10/1989 | Tedham et al. | 312/255 |
| 5,020,768 A | | 6/1991 | Hardt et al. | 248/678 |
| 5,263,668 A | * | 11/1993 | Reiter | 248/346.01 |
| 5,388,792 A | | 2/1995 | Hastings et al. | 248/188.1 |
| 5,470,042 A | * | 11/1995 | Fietz et al. | 248/678 |
| 5,685,512 A | * | 11/1997 | Yang | 248/298.1 |
| 5,749,637 A | | 5/1998 | McMahan et al. | 312/223.2 |
| 6,616,113 B2 | * | 9/2003 | Justin | 248/346.01 |

* cited by examiner

Primary Examiner—Janet M. Wilkens

(57) ABSTRACT

A chassis casing for a computer comprising a retractable stabilizing device adapted to be slidably inserted into the retractable position within the chassis casing is disclosed.

35 Claims, 3 Drawing Sheets

RETRACTABLE STABILIZING SYSTEMS FOR COMPUTER HARDWARE

TECHNICAL FIELD

The present invention relates to apparatus for mounting and/or stabilizing computers and computer related hardware. More particularly, although not exclusively, this invention relates to devices for mounting and/or stabilizing computers in orientations which ensure that necessary operating functions such as cooling etc are not compromised. The invention also relates to methods and devices for stabilizing computers which can be quickly and easily operated and are adaptable to a variety of aethestic requirements in relation to computer design.

BACKGROUND ART

Traditional designs for personal computers have evolved from the 'standard' personal computer, exemplified by the IBM-AT, to small form-factor PCs such as the e-PC manufactured by Hewlett Packard Company. This design development has resulted in many innovative and creative designs solutions reflecting the acceptance of such hardware in the business and home environment. This evolution in design has also been influenced by aesthetic considerations which were previously considered secondary to the basic task of housing the internal computer hardware in a functional casing unit.

Early types of personal computers were generally characterized by a horizontally mounted motherboards resulting in a quite low case profile with a relatively large footprint. This was necessitated by the PC case needing to be sufficiently large to accommodate motherboard, disk drives, power supplies etc. Early expansion board topologies reinforced the popularity of this type of case construction. However such designs consumed a significant amount of desk or floor space and a number of design solutions were proposed to reduce the PC footprint.

Early adaptations of known PC designs aimed at reducing the PC footprint included mounting the PC case on its side. Such solutions often involved simply tilting a standard PC on its edge, or constructing the case and chassis in a vertical orientation. Designs of the latter type are referred to as 'tower' configurations and sometimes involve the redesign of the computers internal hardware topology to accommodate this orientation.

A common problem with such configurations is that upright or slim line computer cases can be unstable and prone to tipping over. This is particularly so when the computer is located on the floor or perhaps where additional hardware components, for example external disk drives etc, are located on top of the computer case.

Early simple solutions included providing a separate resilient plastic 'foot' device in the form of a cradle into which the edge-mounted PC case could be slid. Such designs are not ideal as PC cases come in a variety of dimensions and not all stabilizing means can accommodate every model of PC. Other solutions include integrally molding into the base of the tower case, an outwardly oriented flange or rim. Others include incorporating molded or extruded rails mounted along the edge of the computer casing to extend the footprint slightly. Such methods can increase the footprint and improve stability. However, they may not be ideal as they often do not provide sufficient stability and flexibility in terms of operating functions (cooling etc). These modifications can also interfere with aesthetic aspects or the casing as well as hamper the ability to quickly and easily re-orient the computer in a horizontal or vertical position.

Very small footprint PCs such as the c-PC manufactured by Hewlett Packard Company, are constructed with a relatively flat profile and can be oriented vertically or horizontally. The stability of such computers can be enhanced with careful distribution of weight via component location within the casing. However it remains desirable to augment the stability of such computer form-factors with additional stabilizing devices.

As noted above, separate foot components may be used, however these can suffer the same drawbacks as for PCs with conventional dimensions.

Stability problems apply equally to large footprint PCs, server boxes and the like. In such cases, it is desirable that the computer casing incorporate a solid, secure and easily operated stabilizing means.

It is an object of the present invention to provide for a and device for stabilizing a PC or computer equipment which is aesthetically pleasing, non-intrusive, compact, solid, easy to retract/extend and which is preferably able to allow through-wall cooling through the underside of the vertically mounted computer or hardware component casing.

DISCLOSURE OF THE INVENTION

In one aspect the invention provides for a chassis cover for a unit having a horizontal and vertical orientation, the chassis cover including:

a plurality of apertures adapted to slidably receive corresponding stabilizing means therein; and a plurality of stabilizing means adapted to be located in a stabilizing position and a retracted position, wherein the stabilizing means are adapted to be slidably inserted into the retracted position within a corresponding aperture and wherein in the extended position, the casing is stabilized.

The stabilizing means are preferably shaped so as to be slidably located in corresponding apertures in the computer case.

The stabilizing means are further preferably shaped so that in the extended position, the computer casing is substantially vertically displaced so that when resting on a support surface by means of the stabilizing means, the computer casing is stabilized and held above said surface.

Preferably the stabilizing means are substantially U-shaped whereby the arms of the U are shaped and adapted to be slidably inserted into corresponding apertures in the computer case and the base of the U forms a base member which rests on the support surface.

Preferably, the apertures in the casing are oriented so that in the extended position, the computer is stabilized in an elevated orientation with respect to the support surface.

Preferably, the arms are curved and corresponding apertures are similarly shaped so that in the extended position, the computer is stabilized in an elevated orientation with respect to the support surface.

The distal ends of the arms may incorporate an arm engagement means which, in the retracted and/or extended positions, are adapted to engage with corresponding aperture engagement means formed in the apertures.

The arm engagement means may be in the form of protruding elements which are adapted to engage with corresponding aperture engagement means in the form of detents.

The base of the U may further incorporate or be formed from a material adapted to increase friction between the extension portion and the support surface.

BRIEF DESCRIPTION OF THE DRAWINGS

The present invention will now be described by way of example only and with reference to the drawings in which.

BEST MODE FOR CARRYING OUT THE INVENTION

Figure 1:
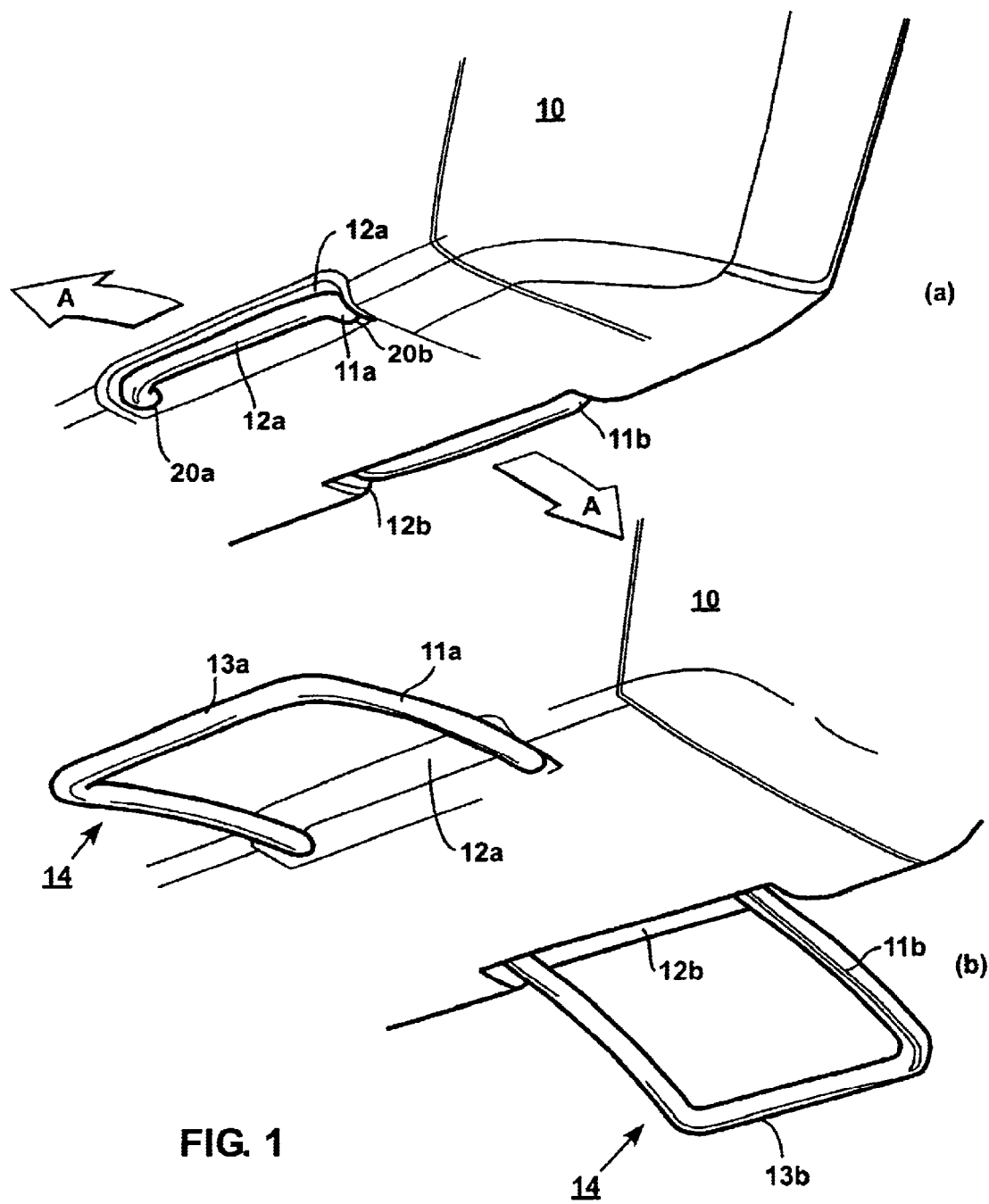
FIG. 1: illustrates a computer stabilizing system with a stabilizing means in the retracted (a) and extended (b) positions.

Referring to FIG. 1, an exemplary embodiment of the present invention is shown. The embodiment described below reflects the particular design as shown in the accompanying figures. In particular an embodiment is described which includes two downwardly curved stabilizing means 14 which, in the retracted configuration, are substantially embedded or concealed in the computer casing. Other layouts, shapes and configurations are contemplated and are to be considered within the scope of the present invention. These will be discussed below where necessary.

Referring to FIG. 1, a computer case 10 has apertures 20a,b and 20c constructed therein. Aperture 20c is visible in cross-section in FIG. 2b. A fourth aperture (not shown) is located behind aperture 20c in FIG. 2b. Two stabilizing means 14 are, in the present embodiment, constructed in the form of a U-shaped section and are mounted in the apertures. The shape of the stabilizing means is most easily seen in FIG. 1(b). The two U-shaped sections have arms 11a and 11b and base members 13a and. 13b respectfully.

Figure 2:
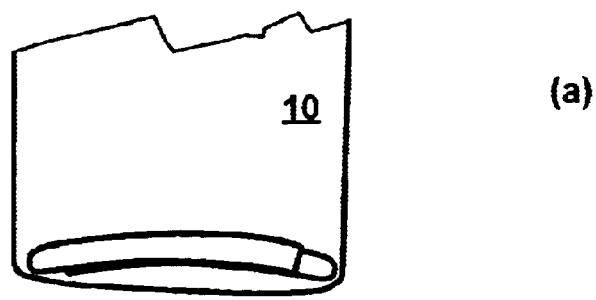
FIG. 2: illustrates a cross sectional view through a computer incorporating a computer stabilizing system with stabilizing means in the retracted (a) and extended (b) positions.
Figure 2:
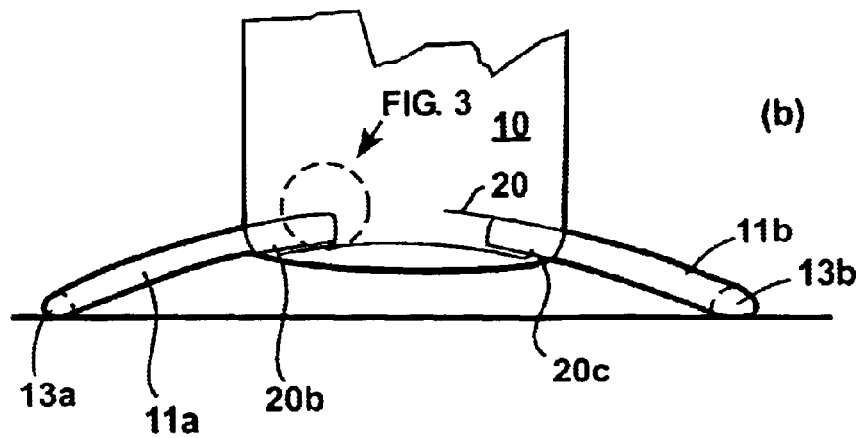

When viewed end on as in FIG. 2, it can be seen that the stabilizing means 14 is slightly curved in a downward direction. This particular construction, while producing an aethsetically pleasing form, also serves to reduce the space taken up by the stabilizing means when retracted into the computer casing as the aperture and it's associated internal construction, may be mounted closer to the lower sidewall of the casing.

The stabilizing means may also be constructed so that they are flat (when viewed end-on). However, ii an angled orientation is required in order to elevate the supported computer casing, the apertures which accommodate the retracted stabilizing means will be angled further up and into the computer casing. Although such a construction is feasible in accordance with the present invention, it may be less desirable if volume within the computer casing is at a premium or if the apertures and their support construction interfere with the placement of any of the computers interior components.

Returning to FIG. 1(b), the stabilizing means arms 11a,b are inserted into corresponding apertures 20a,b in a sliding manner. The dimensions of the stabilizing means 14 and apertures 20 are such that the former slides smoothly into the latter with relatively little sideways play. This helps stabilize the computer in an upright position and increases the effective footprint of the computer housing without consuming actual and substantial amounts of support surface area.

In the preferred embodiment, the base members 13a,b are recessed into depressions 12a,b in the computer casing when the stabilizing means is in the retracted position. This construction serves to conceal the base members when the stabilizing means 14 are stored, for example, for transportation. This is shown in FIG. 1(a).

It an alternative construction, in the retracted configuration, the base members 13a,b may simply lie flush with the lower corner or underside of the computer casing. Such a configuration may be desirable for certain design briefs, styles and implementations of casing design. However in the preferred embodiment, the base members 13a,b can be retracted as shown in FIG. 1. In the alternative embodiment where the base members are flush or concealed in the case, covers may be used to cover the recess in which the base members are stored. These covers may be in the form of flaps which can be slide aside or hinged so as to expose the base members concealed therein.

To configure the stabilizing system as a whole, the stabilizing means 14 are extracted from the computer casing and withdrawn in the directions indicated by the arrows A and A' in FIG. 1(a). As the stabilizing means 14 are withdrawn, they curve downward and the base members 13a,b retain their orientation so as to lie substantially parallel to a plane defined by the support surface (not shown). Other orientations are possibly, for example, if the casing only includes a single pair of stabilizing means. In this case the base members may be angled to match the fore-aft tilt angle of the computer when on the support surface.

Figure 3:
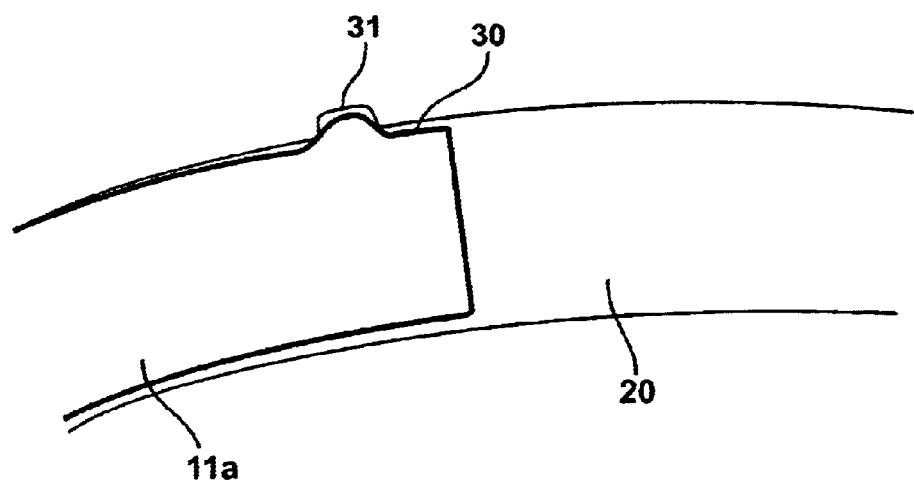
FIG. 3: illustrates a cross sectional view of a detail of a stabilizer means retaining system.

In a preferred embodiment, the stabilizing means may be locked into the stabilizing configuration by a locking or engagement mechanism C as shown in FIG. 2(b). This stops the stabilizing means inadvertently sliding back into the computer case once extended. In the example shown, this locking mechanism includes an arm engagement means, hereafter referred to as a protruding element 30, formed in the end of the arm portions of the stabilizing means 14. This detail can be seen in FIG. 3. A corresponding aperture engagement means, hereafter referred to as a detent 31, is formed in the interior surface of the aperture 20.

If the stabilizing means arm 11a and/or aperture is constructed from a suitably flexible or resilient material, the protruding element 30 will snap into engagement with the detent 31 when the two are brought into registration. This action can be seen in FIG. 2(b) where the stabilizing means 14 is withdrawn from the aperture and moved into the stabilizing position. At this point, the combination of the engagement means 30 and 31 locks the stabilizing means into place.

Alternative constructions of engagement means are viable. For example, the protruding member may be in the form of a locking member mounted in the stabilizing means arm 11a,b and biased by some mechanism such as a spring, so that it may be retracted into the arm section 11a,b when the stabilizing means is slid into the aperture 20. When the protruding member reaches the detent 31, it is thus biased into engagement with the detent. The degree of biasing may be adjusted so that a user can easily manually retract or extend the stabilizing means without undue pressure or strength while the engagement is sufficient to prevent the stabilizing means retracting in error. The stabilizing means is disengaged by simply pulling the stabilizing means out of the casing.

In the construction shown in the figures, it is envisaged that the engagement of the stabilizing mean; serves to essentially position the stabilizing means in a desired location. It is considered that the force acting on the stabilizing means would neither be sufficient nor directed so as to cause the stabilizing means to retract while the computer is upright with the stabilizing means extended.

The embodiment shown includes two stabilizing means 14, each extending from opposite sides of the computer casing 10. In such a configuration the apertures may be offset with respect to one another along the fore-aft axis of the computer casing. This is so that the stabilizing means may be slid into the retracted position in a convenient and compact manner (see FIG. 2(a)).

It is also preferable to include an engagement means C such as that described above, arranged to engage when the stabilizing means 14 are in the retracted configuration. This prevents the stabilizing means 14 sliding out of the computer casing when the computer is being transported or moved.

The stabilizer system as described herein may also include a plurality of stabilizing means 14. In a preferred configuration this may include four stabilizing means 14.

The utility of the invention is clear when a situation is considered where a computer is shipped or transported with the stabilizing means 14 in the retracted position (see FIG. 2(a)). When it is required to secure the computer in place, a user grasps the base member(s) 13a as the computer is set down on a support surface whereby the stabilizing means is withdrawn and locked into place by the engagement means.

A computer already placed in a vertical orientation and initially configured with the stabilizing means retracted can also be reconfigured in a stabilized position by lifting the casing up and extending each stabilizing means in turn. This operation can be performed by a single user and does not require that the computer be turned over, or any part of the casing or chassis be disassembled.

As noted above the stabilizing means may be flat rather than curved and/or oriented downward so as to elevate the computer casing above the support surface. Alternatively, the extension means may simply be capable of extraction sideways out of the casing so that the underside of the computer rests on the support surface and is stabilized by the extended stabilizing means protruding from opposite sides. Variations are possible depending on the particular design brief and complexity of the stabilizing system. In the elevated configuration, through-case cooling is ensured as the computer casing is lifted off the ground thus allowing airflow around the computer. Other variations include fabricating the stabilizing means from tubular or other material having a different cross-section, for example circular, square etc. The stabilizing means may also be molded and be formed in different shapes with one or more arms adapted for insertion into the casing (via suitable shaped apertures).

The present stabilizing system is considered advantageous as the stabilizing means are, in the retracted position, recessed into the computer casing via the depressions 12a,b which are shaped to accommodate them. This allows computers or computer casings to be shipped in a convenient and compact form in which the stabilizing means is hidden or stored until use. A further advantage of the invention is that the integrated foot cannot get lost in transit or when the computer is configured in the non-stabilized position.

Although the invention has been described by way of example and with reference to particular embodiments it is to be understood that modification and/or improvements may be made without departing from the scope of the appended claims.

Where in the foregoing description reference has been made to integers or elements having known equivalents, then such equivalents are herein incorporated as if individually set forth.

What is claimed is:

1. A chassis casing including:
   a plurality of channels adapted to slidably receive and substantially encapsulate one or more arms of corresponding stabilizing means therein,
   one or more stabilizing means adapted to be located in an extended position and/or a retracted position, wherein the stabilizing means are adapted to be slidably inserted into the retracted position within a corresponding one of said plurality of channels and wherein, in the extended position, the chassis casing is stabilized in an elevated position with respect to a support surface.

2. A chassis casing as claimed in claim 1 wherein the stabilizing means are shaped and oriented so that in the extended position, the chassis casing is stabilized with respect to the support surface.

3. A chassis casing as claimed in claim 1 wherein the stabilizing means have two arms and a base member thereby forming a U-shape, wherein the arms are shaped and adapted to be slidably inserted into corresponding channels in the chassis casing and where the base member is adapted to stabilize the chassis casing on the support surface.

4. A chassis casing as claimed in claim 3 wherein the arms are curved and oriented so that in the extended position, the chassis casing is stabilized in an elevated orientation with respect to the support surface.

5. A chassis casing as claimed in claim 3 wherein distal ends of the arms incorporate arm engagement means which, in the retracted and/or extended positions, are adapted to engage with corresponding channel engagement means formed in the channels.

6. A chassis casing as claimed in claim 5 wherein each arm engagement means is in the form of a protruding element which is adapted to engage with a corresponding channel engagement means.

7. A chassis casing as claimed in claim 6 wherein the engagement means is in the form of detents.

8. A chassis casing as claimed in claim 3 wherein the base member of the U-shape incorporates or is formed from a material adapted to increase friction between the base member and the support surface.

9. A chassis casing as claimed in claim 1 wherein the chassis casing includes recesses adapted so that in the retracted configuration the stabilizing means are substantially recessed into the surface of the chassis.

10. A computer incorporating a chassis casing as claimed in claim 1.

11. A chassis casing as claimed in claim 6 wherein there is a one to one relationship of the one or more arms and the channels.

12. A chassis casing as claimed in claim 1 wherein the multiple channels are at an angle to the support surface so as when the one or more stabilizing means are in the extended position the one or more stabilizing means are at the angle to the support surface.

13. A chassis casing as claimed in claim 12 wherein the multiple channels and one or more stabilizing means are curved.

14. A retractable stabilizing apparatus associated with a chassis casing, said retractable stabilizing apparatus comprising:
   a plurality of channels arranged in said chassis casing, each one of said channels slidably receiving one or more arms of corresponding stabilizing means therein,
   one or more of said stabilizing means adapted to be located in an extended position and/or a retracted position, wherein the stabilizing means are adapted to be slidably inserted into the retracted position within a corresponding one of said plurality of channels and wherein, in the extended position, the one or more stabilizing means extend laterally from the chassis casing to meet a support surface at an angle and the chassis casing is stabilized in an elevated position with respect to when the stabilizing means are in the retracted position.

15. The retractable stabilizing apparatus as claimed in claim 14 wherein the multiple channels are at an angle to the support surface so as when the one or more stabilizing means are in the extended position the one or more stabilizing means are at the angle to the support surface.

16. The chassis casing as claimed in claim 15 wherein the multiple channels and one or more stabilizing means are curved.

17. The retractable stabilizing apparatus as claimed in claim 15 wherein the multiple channels substantially encapsulate one or more arms of corresponding stabilizing means when said stabilizing means are in the retracted position.

18. The retractable stabilizing apparatus as claimed in claim 14 wherein the stabilizing means have two arms and a base member thereby forming a U-shape, wherein the arms are shaped and adapted to be slidably inserted into corresponding channels in the chassis casing and where the base member is adapted to stabilize the chassis casing on the support surface.

19. The retractable stabilizing apparatus as claimed in claim 18 wherein distal ends of the arms incorporate arm engagement means which, in the retracted and/or extended positions, are adapted to engage with corresponding channel engagement means formed in the channels.

20. The retractable stabilizing apparatus as claimed in claim 19 wherein each arm engagement means is in the form of a protruding element which is adapted to engage with a corresponding channel engagement means.

21. The retractable stabilizing apparatus as claimed in claim 20 wherein the engagement means is in the form of detents.

22. The retractable stabilizing apparatus as claimed in claim 18 wherein the base member of the U-shape incorporates or is formed from a material adapted to increase friction between the base member and the support surface.

23. The retractable stabilizing apparatus as claimed in claim 14 wherein the chassis casing includes recesses adapted so that in the retracted configuration the stabilizing means are substantially recessed into the surface of the chassis.

24. The retractable stabilizing apparatus as claimed in claim 14 wherein there is a one to one relationship of the arms and the channels.

25. A retractable stabilizing apparatus associated with a chassis casing, said retractable stabilizing apparatus comprising:
   a plurality of channels arranged in said chassis casing, each one of said channels slidably receiving one or more arms of corresponding stabilizing elements therein,
   one or more of said stabilizing elements adapted to be located in an extended position and/or a retracted position, wherein the stabilizing elements are adapted to be slidably inserted into the retracted position within a corresponding one of said plurality of channels and wherein, in the extended position, the one or more stabilizing elements extend laterally from the chassis casing to meet a support surface at an angle and the chassis casing is stabilized in an elevated position with respect to when the stabilizing elements are in the refracted position.

26. The retractable stabilizing apparatus as claimed in claim 25 wherein the multiple channels are at an angle to the support surface so as when the one or more stabilizing elements are in the extended position the one or more stabilizing elements are at the angle to the support surface.

27. The retractable stabilizing apparatus as claimed in claim 26 wherein the multiple channels and one or more stabilizing elements are curved.

28. The retractable stabilizing apparatus as claimed in claim 26 wherein the multiple channels substantially encapsulate said one or more arms of corresponding stabilizing elements.

29. The chassis casing as claimed in claim 25 wherein the stabilizing elements have two arms and a base member thereby forming a U-shape, wherein the arms are shaped and adapted to be slidably inserted into corresponding channels in the chassis casing and where the base member is adapted to stabilize the chassis casing on the support surface.

30. The retractable stabilizing apparatus as claimed in claim 29 wherein distal ends of the arms incorporate arm engagement elements which, in the retracted anchor extended positions, are adapted to engage with corresponding channel engagement elements formed in the channels.

31. The retractable stabilizing apparatus as claimed in claim 30 wherein each arm engagement element is in the form of a protruding element which is adapted to engage with a corresponding channel engagement element.

32. The retractable stabilizing apparatus as claimed in claim 31 wherein the engagement elements are in the form of detents.

33. The retractable stabilizing apparatus as claimed in claim 29 wherein the base member of the U-shape incorporates or is formed from a material adapted to increase friction between the base member and the support surface.

34. The retractable stabilizing apparatus as claimed in claim 25 wherein the chassis casing includes recesses adapted so that in the retracted configuration the stabilizing elements are substantially recessed into the surface of the chassis.

35. The retractable stabilizing apparatus as claimed in claim 25 wherein there is a one to one relationship of the arms and the channels.

* * * * *